United States Patent [19]

Sefcik

[11] 4,272,217

[45] Jun. 9, 1981

[54] FORK LIFT ATTACHMENT SYSTEM

[76] Inventor: Robert Sefcik, 3 Briar La., Cherry Hill, N.J. 08002

[21] Appl. No.: 880,192

[22] Filed: Feb. 22, 1978

[51] Int. Cl.³ .............................................. B65G 65/34

[52] U.S. Cl. .................................... 414/420; 414/421

[58] Field of Search ............... 414/419, 420, 421, 422, 414/607, 608, 717

[56] References Cited

U.S. PATENT DOCUMENTS

| | | | |
|---|---|---|---|
| 1,753,756 | 4/1930 | Small | 414/420 |
| 1,854,130 | 4/1932 | Francis | 414/419 |
| 2,979,217 | 4/1961 | Tomasovich | 414/420 |
| 3,662,910 | 5/1972 | Herpich et al. | 414/421 |
| 3,797,684 | 3/1974 | Brandt | 414/420 |

FOREIGN PATENT DOCUMENTS

| | | | |
|---|---|---|---|
| 1164112 | 9/1969 | United Kingdom | 414/420 |

*Primary Examiner*—Stephen G. Kunin
*Assistant Examiner*—Edmond G. Rishell, Jr.
*Attorney, Agent, or Firm*—Maleson, Rosenberg & Bilker

[57] ABSTRACT

A fork lift attachment system is adapted to be mounted to a standard fork lift truck utilized for vertically lifting and lowering a container in a reversible manner. A modified container is utilized in conjunction with the fork lift attachment system where the container includes a pair of transversely displaced channel members securely fixed to opposing transverse side panels of the container. The attachment system includes a releasable mounting mechanism for insertion within the channel members of the modified container for mounting the container to the fork lift attachment system. A rotative displacement mechanism allows for the container to be rotated about a first axis line extending in a direction substantially normal to a vertical displacement direction subsequent to the container being mounted on the fork lift attachment system. Thus, the attachment system allows for both vertical reversible movement of the modified container while allowing independent rotation of the container about axis normal to the vertical displacement direction.

12 Claims, 8 Drawing Figures

FIG. 1
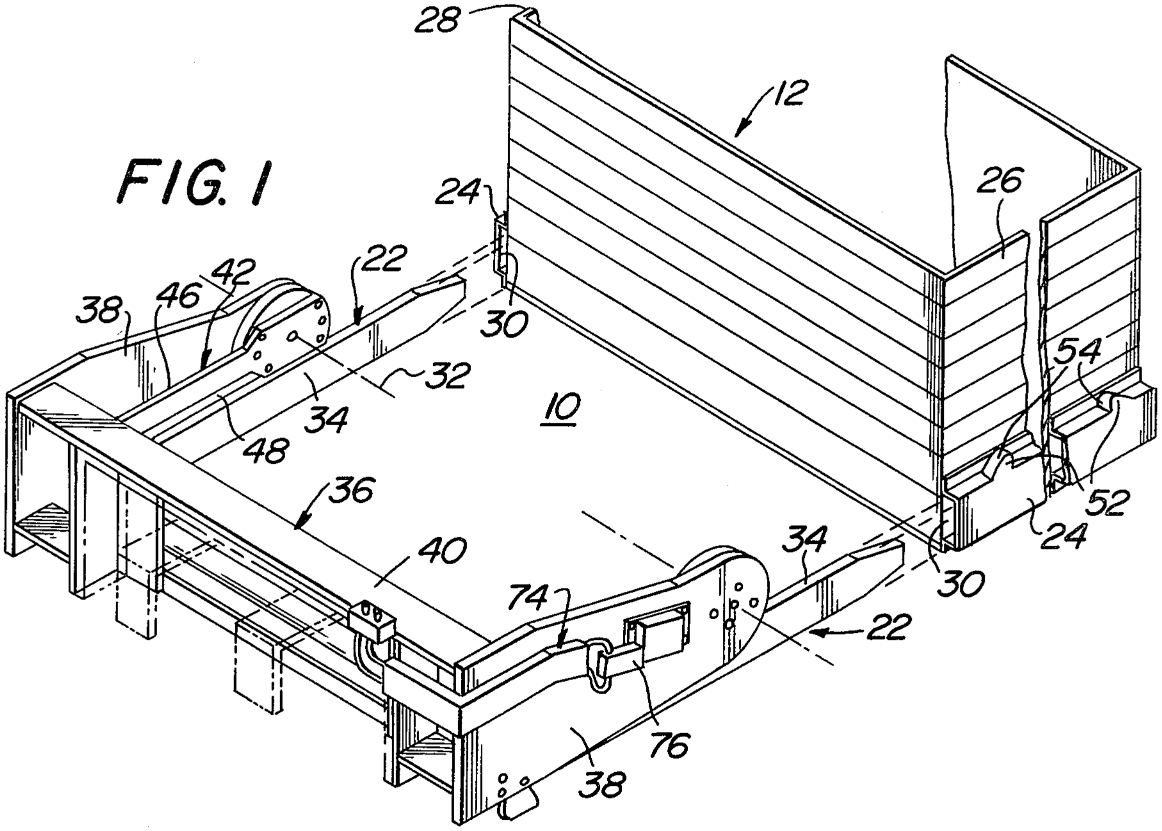
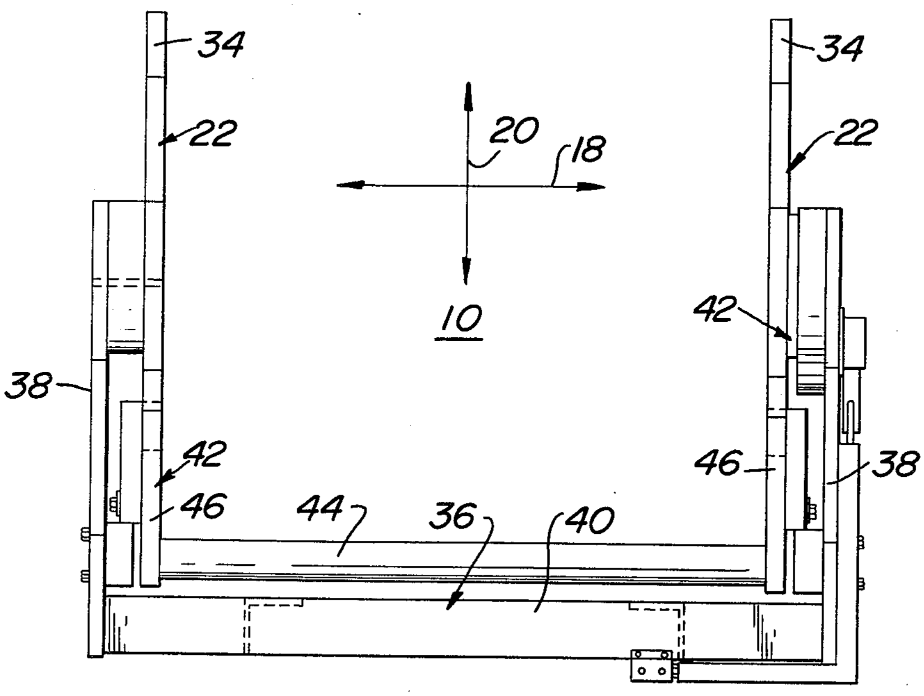
FIG. 2

FIG. 4
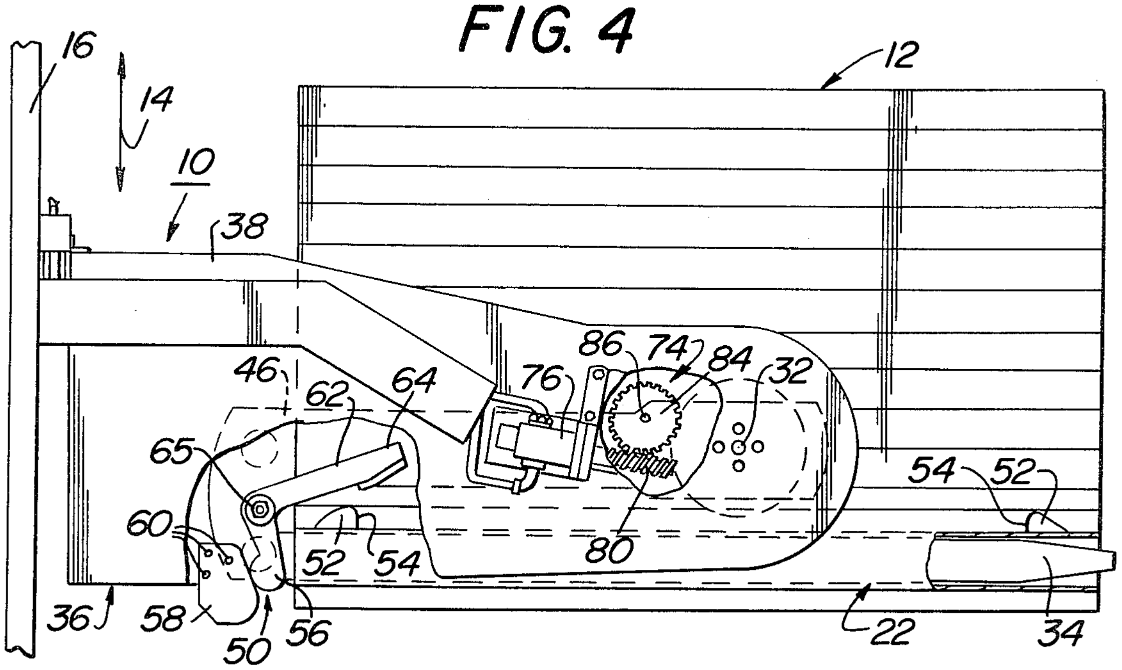
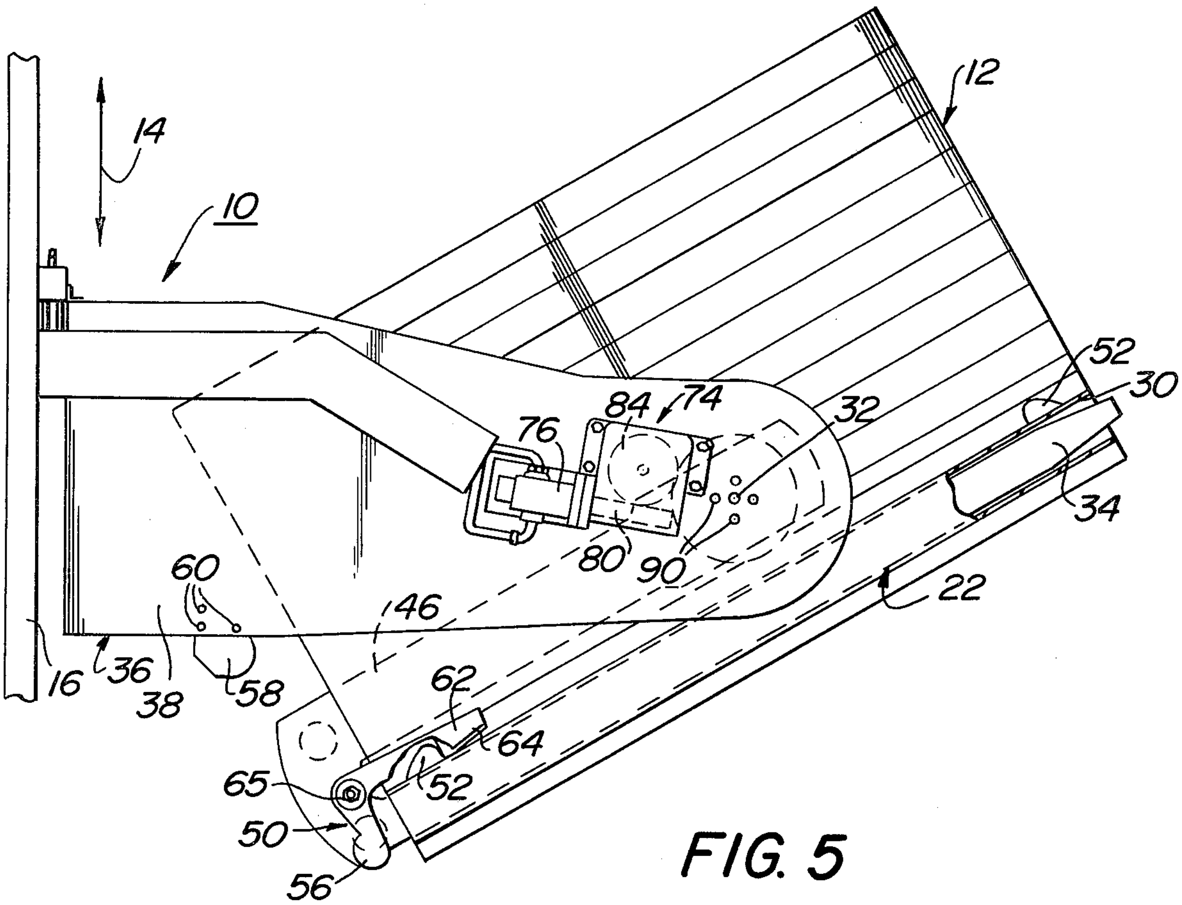
FIG. 5

FORK LIFT ATTACHMENT SYSTEM

BACKGROUND OF THE INVENTION

1. FIELD OF THE INVENTION

This invention relates to automatic displacement of containers. In particular, this invention relates to attachment systems adapted to be mounted on standard fork lift trucks to provide both vertical displacement of containers mounted on the system while independently allowing rotation of the containers about an axis substantially normal to the vertical displacement direction of the containers. Still further, this invention relates to attachment systems which releasably capture the container on the fork lift attachment system when the container is being rotated and simultaneously allows for removal of the container from the fork lift truck when the container is aligned in a horizontal plane.

2. PRIOR ART

Fork lift trucks for vertically moving or displacing containers are well known in the art. However, such prior fork lift trucks only allow for vertical displacement of the containers mounted thereon. Such prior fork lift truck systems do not permit containers to be rotated for partial removal of the contents of the containers. Thus, in such prior art fork lift truck systems, the container is filled with materials and then moved possibly to a disposal site. The container is then placed on a base surface and the container either must be manually tilted or the contents manually removed while the container is in a horizontal plane. Such removal of contents from the container increases labor costs and does not permit removal of the contents of the container in one continuous operation.

In some prior fork lift truck systems where the container is brought to a disposal site, another mechanism must be utilized for removal of the contents of the container. Thus, in prior fork lift trucks, additional capital investment is necessitated to provide for removal of the container contents. This has the effect of further increasing labor costs as well as increasing other expenditures for the removal operation.

SUMMARY OF THE INVENTION

A fork lift attachment system adapted to be mounted to a fork lift truck used for vertically displacing a container in a reversable manner. The fork lift attachment system includes a releasable mounting mechanism for releasably mounting the container to the fork lift attachment system. Further, the fork lift attachment system includes a rotative displacement mechanism for rotatively displacing the container about a first axis line extending substantially normal to the vertical displacement subsequent to the container being mounted to the fork lift attachment system.

BRIEF DESCRIPTION OF THE DRAWINGS

FIG. 1 is a perspective view of the fork lift attachment system shown in exploded relation with respect to the modified container to be mounted on the fork lift attachment system;

FIG. 2 is a plan view of the fork lift attachment system;

FIG. 4 is an elevational view of the fork lift attachment system having the modified container mounted thereon in a horizontal plane;

FIG. 5 is a side view of the fork lift attachment system having the modified container mounted thereon in rotative displacement with respect to the horizontal plane;

DESCRIPTION OF THE PREFERRED EMBODIMENTS

Figure 3:
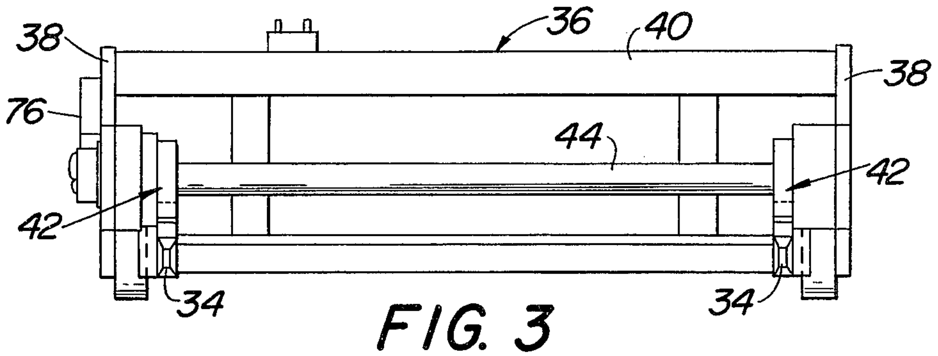
FIG. 3 is a frontal view of the fork lift attachment system of the subject invention.
Figure 6:
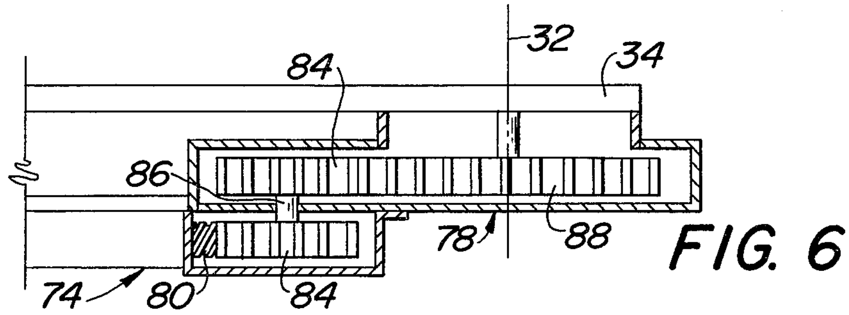
FIG. 6 is a top view partially cut away of the rotative displacement mechanism.

Referring now to FIGS. 1–5, there is shown fork lift attachment system 10 for providing rotational displacement of container 12 which is adapted or modified to be releasably mounted to system 10. Fork lift attachment system 10 of the subject inventive concept is positionally mounted on a standard fork lift truck commonly used in industry and well known in the art (not shown). System 10 is reversably actuated in the vertical direction defined by directional arrows 14. As shown in FIGS. 4 and 5, fork lift attachment system 10 is mounted on frontal elevator post 16 of the standard fork lift truck for reversible vertical displacement in the standard mode of operation.

The overall concept of fork lift attachment system 10 is to provide a mechanism whereby modified container 12 may be displaceably rotated about an axis line to be defined in following paragraphs which lies parallel to transverse direction or axis 18 shown in FIG. 2. In this manner, refuse, waste material, or other compositions contained within container 12 may be inclined with respect to a predetermined axis line as shown in FIGS. 4 and 5 in order to removably displace materials within container 12 while maintaining container 12 in fixed relation on fork lift attachment system 10.

Container 12 is generally rectangular in contour as is shown in FIG. 1. Container 12 may be formed of wood, steel, or other like composition having structural integrity sufficient to maintain materials deposited therein. Modification of container 12 includes a pair of container insert members 24 which are fixedly secured to opposing container transverse sides 26 and 28.

Container insert members 24 are formed of channel members having longitudinally extending through passages 30 adapted for cooperation of fork lift attachment system 10. Insert members or channel members 24 extend in longitudinal direction 20 throughout the longitudinally extended length of each of opposing transverse sides 26 and 28. Additionally, channel members 24 are fixedly secured to the container side panels through bolting, screws, welding, or some like technique not important to the inventive concept, with the exception that the fixed securement mechanism be sufficient to provide for a structurally competent housing to contain the loads applied by the material within modified container 12.

As shown in FIGS. 1, 4 and 5, channel members 24 are mounted to a lower portion of modified container 12 however insert members 24 may be secured at varying heights when taken with respect to the vertical direction of each of transverse sides 26 and 28. When insert or channel members 24 are mounted on a lower portion of container side walls 26 and 28 the vertical displacement dimension is obviously maximized thus providing the operator greater flexibility in movement capability.

Fork lift attachment system 10 includes releaseable mounting mechanism for releasably securing modified container 12 to fork lift attachment 10 in order that container 12 may be vertically displaced in vertical direction 14 as well as being reversably displaceable about first axis line 32 clearly shown in FIG. 1. Releasable mounting mechanism 22 includes a pair of longitudinally extending arm members 34 being displaced each from the other in transverse direction 18. As can be seen, arm members 34 are longitudinally insertable within channel members 24 of the modified container 12. In this manner, arm members 34 provide a stabilized horizontal base plane upon which modified container 12 may be reversably displaced in direction 14. Vertical displacement of arm members 34 and consequently modified container 12 is provided through vertically displaceable frame member 36 which includes a pair of side frame members 38 displaced each from the other in transverse direction 18. Side frame members 38 are secured each to the other in fixed alignment through frame bar 40 which may be mounted to side frame members 38 on opposing transverse sides thereof through bolting screws or other fixed securement mechanism not important to the inventive concept as is herein developed. In this manner, frame bar 40 and side frame members 38 are vertically moveable with respect to fork lift vertical elevator post 16 however, such is non-rotatable. As will be shown in following paragraphs, side frame members 38 formed of steel or other metallic composition is provided in order to maintain a base system for rotation of modified container 12. Further, it will be shown that arm members 34 are rotatably actuatable in a reversable direction about first axis of line 32 when taken with respect to frame member 36 and the aforementioned elements.

Releasable mounting mechanism 22 includes a pair of longitudinally extending rotatively displaceable U-shaped frame members 42 of which arm members 34 form one leg thereof. Each of U-shaped frame members 42 is transversely displaced in fixed alignment each with respect to the other and is rotatively displaceable about first axis line 32 when taken with respect to frame member 36. Opposing U-shaped frame members 42 are mounted in secured transverse alignment each with respect to the other through cross bar 44 through bolting, screws, welding or some like fixed securement mechanism. In this manner, the opposing frame members 42 are rotatively displaceable in fixed axis alignment each with respect to the other.

Opposing U-shaped frame members 42 include hereinbefore described longitudinally extended pair of arm members 34 adapted for insert within container channel members 24. Additionally, frame members 42 include longitudinally extending second arm members 46 which are rotationally actuated for responsively rotationally displacing first arm members 34. Second arm members 46 are displaced from first arm members 34 in the vertical direction by slot 48 within which channel insert members 24 are positionally located between second arm members 46 and first arm members 34 when first arm members 34 are inserted into modified container 12. As can be seen in FIGS. 1 and 2, first arm members 34 extend in longitudinal direction 20 a greater amount than second arm members 46 for insert through passage 30 formed within channel members 24.

As is evident, if the first arm members 34 were slidably engaged within channel members 24 with no further capturing mechanism, such would be amenable to vertical displacement 14 however, upon rotation of modified container 12 about first axis line 32 in a forward direction when taken with respect to elevator post 16, modified container 12 would be forced through gravity assist to be released from first arm members 34. This in certain instances would have deleterious effects. Thus, releasable mounting mechanism 22 further includes releasable capturing mechanism 50 for releasably capturing modified container 12 in fixed securement to U-shaped frame members 42 when modified container 12 is rotatably displaced about first axis line 32.

Releasable capturing mechanism 50 includes a pair of lug members fixedly secured to each of channel members 24 as is shown in FIGS. 4 and 5. Lug members 52 are generally formed on an upper surface of channel members 24 on opposing longitudinally displaced sections of insert members 24. Additionally, each of lug members 52 includes forward surfaces 54 which are generally vertically directed in order to minimize any slipping contact from other contacting members to be further discussed in following paragraphs. Lug members 52 are fixedly secured to channel members 24 in some fixed securement manner such as welding, bolting or other like means.

Releasable capturing mechanism 50 further includes cam system 56 which is secured to both frame member 36 and rotatably displaceable U-shaped frame members 42 for acting in cooperative relation with lug members 52 for maintaining modified container 12 in fixed constrainment to first arm members 34 when modified container 12 is rotationally displaced about first axis line 32. Cam system 56 includes cam member 58 shown in FIGS. 4 and 5 which is fixedly secured to side frame members 38. Cam member 58 extends in a downward vertical direction 14 from side frame members 38 and is fixedly mounted through bolts 60 or some like mechanism to each of side frame members 38. Thus, cam members 58 are non-displaceable with respect to side frame members 38 but are moveable in reversable vertical direction 14 as a function of the vertical movement of frame members 38 of overall frame member 36.

Figure 8:
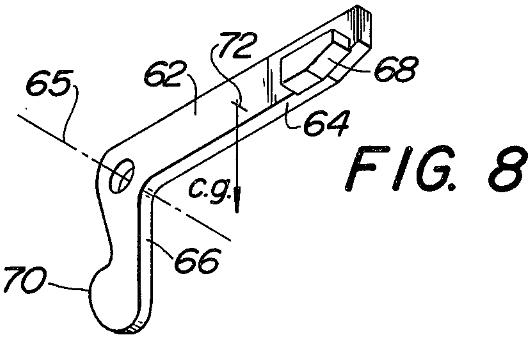
FIG. 8 is a perspective view of the cam follower member forming a portion of a releasable capturing mechanism for maintaining the modified container on the fork lift attachment system when such is rotatively displaced.

Cam system 56 further includes cam follower member 62 shown in FIG. 8 which is rotatably secured to U-shaped frame members 42 for intercepting a path displacement of lug members 52 when modified container 12 is rotatably displaced. Cam follower member 62 is shown in FIG. 8 to be generally L-shaped in contour and is rotatably displaced about the second axis line 65.

Cam follower member 62 includes first arm member 64 and second arm member 66 passing substantially in a normal direction to first arm member 64. First and second arm member 64 and 66 may be formed in one piece formation or mounted each to the other in fixed securement. Follower member 62 includes extension member 68 fixed to first arm member 64 and extending in a transverse direction therefrom. Extension member 68 is positionally located to intercept the removal path of lug members 52 when modified container 12 is rotatively displaced. Thus, a rear surface of extension member 68 interfaces with lug member surfaces 54 in the manner shown in FIG. 5 when modified container 12 is rotatively displaced. Second arm member 66 includes rear surface 70 having a predetermined arcuate contour for interfacing with a forward surface of cam member 58. As can be seen in FIG. 4, when modified container 12 and first arm members 34 are substantially in a horizontal position, cam member 58 interfaces with cam follower member 62 for displacement of cam follower member 62 out of an intercepting path displacement of lug members 52. Thus, when arm members 34 are in a non-rotative positional location, cam member 58 bears against second arm member rear surface 70 to rotatively displace cam follower member 62 about second axis line 65 as shown in FIGS. 4, 5 and 8.

When modified container 12 is rotatively displaced cam member 58 is positionally displaced from cam follower member 62 as is seen in FIG. 5. Cam follower member 62 may include center of gravity 72 located between second axis line 65 and a forward portion of first arm member 64 defined in the neighborhood of extension member 68. This positioning of center of gravity 72 allows for displacing of cam follower member 62 in a predetermined displacement path about second axis line 65 when cam member 58 and cam follower member 62 are in non-abutting relation each with respect to the other. Thus, as shown in FIG. 5 when cam follower member 62 is displaced from cam member 58, first arm member 64 is moveably positioned adjacent an upper surface of channel member 24 in a manner such that extension member 68 is in abutting relation with lug member surface 54 in order to releasably capture modified container 12 on U-shaped frame members 42. In this manner, modified container 12 may be rotatively displaced about first axis line 32 while being constrained to fork lift attachment system 10. However, when modified container 12 is to be released from system 10, frame members 42 are brought to a horizontal extension position and cam follower member 62 is rotably displaced about second axis line 65 in order to take extension member 68 out of an intercepting path with respect to lug members 52 of channel members 24. Arms 34 may then be slidably removed from through passage 30 and modified container 12 remains in a stationery position independent of the longitudinal movement of system 10.

Fork lift attachment system 10 further includes rotative displacement of mechanism 74 shown clearly in FIGS. 1, 4, 5 and 6, 7. Displacement mechanism 74 is provided for rotatively displacing modified container 12 about first axis line 32 extending substantially normal to vertical displacement direction 14. Rotative displacement of modified container 12 is provided subsequent to modified container being mounted to fork lift attachment system 10. As can be seen in FIG. 1, rotative displacement mechanism 74 is fixedly secured to one of side frame members 38.

Displacement mechanism 74 includes hydraulic motor 76 well known in the art and commercially available being utilized for rotative displacement of gear mechanism 78. Gear mechanism 78 is coupled to hydraulic motor 76 and a releasable mounting mechanism 22 for rotatively displacing releasable mounting mechanism 22 about first axis line 32. Hydraulic motor 76 is actuatable independent of any vertical displacement of modified container 12 and is merely provided for actuation of gear mechanism 78 independent of all other function of the standard fork lift truck.

Figure 7:
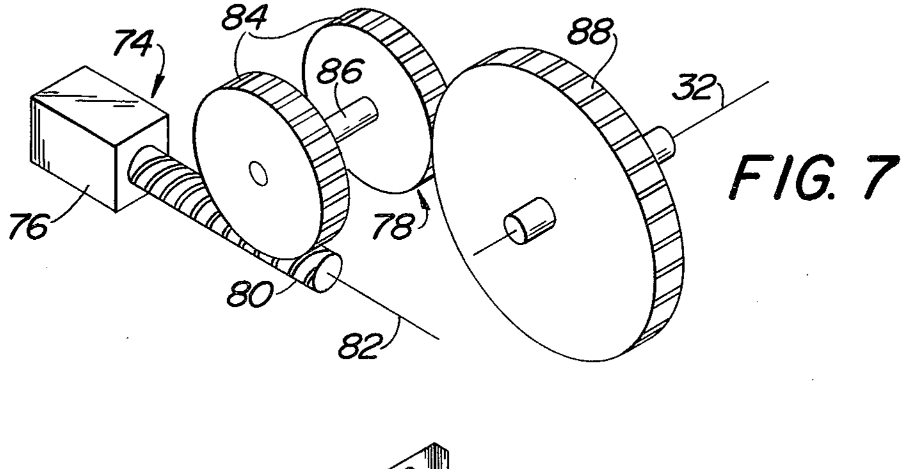
FIG. 7 is a perspective view of the rotative displacement mechanism showing the gear mechanism actuatable for rotative displacement.

Gear mechanism 78 includes worm gear member 80 which is rotatively displaced about third axis line 82 extending substantially normal to first axis line 32 as is clearly seen in FIGS. 4 and 7.

Worm gear member 80 drives a pair of second spur gear members 84 coupled each to the other through second spur gear shaft 86 extending in a direction parallel to first axis line 32. One of second spur gears 84 matingly interfaces with first spur gear member 88 as is clearly seen in FIG. 7. First spur gear member 88 is mounted in fixed constrainment through bolt members 90 to second arm member 46 of U-shaped frame member 42 to provide rotative displacement of frame members 42 responsive to rotative displacement of first spur gear member 88 with respect to second spur gear member 84. In this manner, actuation of hydraulic motor 76 provides for a corresponding rotation of worm gear 80 which is translated into a rotative displacement of second spur gear member 84. Rotation of spur gear member 84 causes a respective rotation of first spur gear member 88 and a corresponding rotative displacement of U-shaped frame members 42 with respect to side frame members 38.

Although this invention has been described in connection with specific form and embodiments thereof, it will be appreciated that various modifications other than those discussed above may be resorted to without departing from the spirit or scope of the invention. For example, equivalent elemental structure may be substituted for those specifically shown and described, certain features may be used independently of other features, and in some cases, elements may be reversed, all without departing from the spirit or scope of the invention as defined in the appended claims.

What is claimed is:

1. A fork lift attachment system having a transverse axis adapted to be mounted to a fork lift truck used for vertically displacing a container in a reversible manner with respect to a horizontal plane comprising:

(a) means for releaseably mounting said container to said fork lift attachment system including (i) a pair of longitudinally extending arm members, said arm members being transversely displaced each from the other and (ii) a pair of container insert members fixedly secured to opposing transverse sides of said container, said insert members adapted for insertion of said arm members, and including a pair of channel members each having a longitudinally extending through passage for insert of said arm members, (b) means for reversibly rotating said container about a first axis line, said first axis line extending (1) substantially normal to said vertical displacement and (2) substantially parallel to said transverse axis subsequent to said container being mounted to said fork lift attachment system (c) a vertically displaceable frame member mounted to said fork lift truck, said arm members being rotatably displaceable with respect to said frame member about said first axis line, (d) means for releaseably capturing said container including (i) at least one lug member fixedly secured to at least one channel member, and (ii) cam means secured to said frame member and at least one arm member for acting in cooperative relation with said lug member for maintaining said container in fixed constrainment to said arm member when said container is rotationally displaced, said cam means including, (A) a cam member fixedly secured to said frame member, and (B) a cam follower member rotatably secured to said arm member for intercepting a path displacement of said lug member when said container is rotatively displaced.

2. The fork lift attachment system as recited in claim 1 where said cam follower member is rotatively mounted to said arm member about a second axis line.

3. The fork lift attachment system as recited in claim 1 where said cam member interfaces with said cam follower member for displacement of said cam follower member out of an intercepting path displacement of said lug member when said arm members are in a non-rotative positional location.

4. The fork lift attachment system as recited in claim 1 where said cam member is positionally displaced from said cam follower member when said arm members are rotatively displaced about said first axis line for intercepting said path displacement of said lug member.

5. The fork lift attachment system as recited in claim 2 where said cam follower member includes a center of gravity positionally located between said second axis line and said lug member for displacing said cam follower member in a predetermined displacement when said cam member and said cam follower member are in non-abutting relation each with respect to the other.

6. The fork lift attachment system as recited in claim 1 where said means for rotatively displacing said container includes:

(a) motor means secured to said releaseable mounting means; and, (b) gear means coupled to said motor means and said releaseable mounting means for rotatively displacing said releaseable mounting means about said first axis line.

7. The fork lift attachment system as recited in claim 6 where said motor means includes a hydraulic drive motor actuatable independent of said vertical displacement of said container.

8. The fork lift attachment system as recited in claim 6 where said gear means includes:

(a) a worm gear member coupled to said motor means, said worm gear member being rotatively displaced about a third axis line extending substantially normal said first axis line; and, (b) a first spur gear member coupled to said worm gear member and secured to said releaseable mounting means about said first axis line.

9. The fork lift attachment system as recited in claim 8 including at least one second spur gear member coupled in mating relation to said worm gear member and said first spur gear member.

10. The fork lift attachment system as recited in claim 1 where said means for releaseably mounting said container includes a pair of longitudinally extending rotatively displaceable U-shaped frame members being transversely displaced each from the other.

11. The fork lift attachment system as recited in claim 10 where said rotatively displaceable U-shaped frame members are fixedly secured each to the other.

12. The fork lift attachment system as recited in claim 11 where said U-shaped frame members include:

(a) a longitudinally extending first arm member for insert within a channel member formed on said container; and, (b) a longitudinally extending second arm member being rotationally actuated for responsively rotationally displacing said first arm member.

* * * * *